US005536769A

United States Patent [19]

Sandor

[11] Patent Number: 5,536,769

[45] Date of Patent: Jul. 16, 1996

[54] COMPOSITIONS FOR PRODUCTION OF FAUX FINISHES

[76] Inventor: Raymond P. Sandor, 3435 Aviation Blvd., Vero Beach, Fla. 32960

[21] Appl. No.: 287,512

[22] Filed: Aug. 8, 1994

Related U.S. Application Data

[63] Continuation-in-part of Ser. No. 114,986, Sep. 2, 1993, Pat. No. 5,348,767.

[51] Int. Cl.$^6$ .......... C08L 31/00

[52] U.S. Cl. .......... 524/388; 524/389; 524/460; 524/514; 524/555; 524/556; 524/590

[58] Field of Search .......... 524/388, 460, 524/514, 556, 555, 590, 903

[56] References Cited

U.S. PATENT DOCUMENTS

| | | | |
|---|---|---|---|
| 3,951,899 | 4/1976 | Seiner | 524/388 |
| 4,014,841 | 3/1977 | Taub | 524/561 |
| 4,243,430 | 1/1981 | Sperry et al. | 524/556 |
| 5,166,254 | 11/1992 | Nickle et al. | 524/555 |
| 5,219,916 | 6/1993 | Den Hartog et al. | 524/522 |

*Primary Examiner*—Paul R. Michl
*Assistant Examiner*—Olga Asinovsky
*Attorney, Agent, or Firm*—Carroll F. Palmer

[57] ABSTRACT

Faux finishes are produced without need for artistic manipulations of coating materials by applying a layer of one or more unique aqueous emulsions to a substrate surface and, while the layer is still wet, applying thereto scattered portions of one or more special blending solvent mixtures, allowing such portions to interact with the color mixture layer to automatically form a faux finish pattern and then allowing the resulting faux finish to dry.

The preferred emulsions have the following weight percentage composition:

| | |
|---|---|
| acrylic polymer | 5%–15% |
| propylene glycol | 20%–75% |
| colorant | 0%–60% |
| non-essential adjuvants | 0%–10%. |

The blending solvent mixtures have the following weight percentage composition:

| | |
|---|---|
| isopropyl alcohol | 10%–30% |
| ethylene glycol monobutyl ether | 10%–30% |
| water | 30%–60% |
| acrylic latex | 5%–30%. |

10 Claims, No Drawings

COMPOSITIONS FOR PRODUCTION OF FAUX FINISHES

RELATED APPLICATION

This application is a continuation-in-part of application Ser. No. 08/114,986, filed Sep. 2, 1993 now U.S. Pat. No. 5,348,767.

BACKGROUND OF THE INVENTION

1. Field of the Invention

This application relates to compositions for the production of faux finishes. More particularly, it concerns compositions that can produce faux effects by interaction of unique products rather than by manual efforts of an artisan.

2. Description of the Prior Art

The creation of imitation marble, granite and like faux finishes has been practiced for centuries primarily as artistic endeavors wherein an artisan manually applies paint to a surface and manipulates it into a pattern that seeks to duplicate the appearance of natural marble, granite, etc. In order to make such operations less labor intensive, a variety of techniques have been devised to get paints or colorants when applied to a substrate to assume a marbleized design without need for detailed manipulation by the artisan.

I recently invented a unique technique for creating faux finishes without need for an artisan to manually produce the marbled or like faux pattern on a surface. This was made possible by the discovery of unique movement of colors applied to an absorbant surface by interaction thereof with special activation liquid. Such invention is disclosed in U.S. Pat. No. 5,122,395, the disclosure of which is incorporated herein by reference.

The present invention provides further improvements in the art of producing faux finishes with little or no manual detailed manipulation by the artisan since the creation of the faux effect is attained by interaction of a plurality of separate unique liquid mixtures provided by the invention.

OBJECTS

A principal object of the invention is the provision of new compositions for the production of faux finishes.

A further object is the provision of such compositions that produce faux effects by interaction of the new products used to cream the faux finish rather than by detailed manual manipulations of an artisan.

Yet another object is the provision of such new faux finishing products that can be used by lay persons to produce impressive faux finishes on building walls, pieces of furniture or any other surfaces that can be decorated with paint or like liquid coating materials.

An additional object is the provision of foundation compositions that contain the fundimental components for forming faux finishes to which the user may add a variety of adjuvants to provide custom compositions to be used in accordance with my new faux finish methods.

Other objects and further scope of applicability of the present invention will become apparent from the detailed descriptions given herein. It should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished, in part, in accordance with the invention by the provision of unique mixtures for the production of faux finishes which contain propylene glycol as an essential component. In the broad sense, mixtures of this type are aqueous emulsions that consist essentially of the following ingredients in the stated percentages:

| | |
|---|---|
| emulsified polymeric resin selected from the group consisting of acrylic resin and polyurethane resin | 5%–15% |
| propylene glycol | 20%–75% |
| colorant | 0%–60% |
| non-essential adjuvants | 0%–10% |
| water | remainder. |

Preferable emulsions of this type consist essentially of the following ingredients in the stated percentages:

| | |
|---|---|
| emulsified polymeric resin selected from the group consisting of acrylic resin and polyurethane resin | 8%–14% |
| propylene glycol | 40%–70% |
| colorant | 1%–50% |
| non-essential adjuvants | 1%–10% |
| water | remainder. |

One preferred form of emulsion of the invention consists essentially of the following ingredients in the stated percentages:

| | |
|---|---|
| emulsified acrylic resin | 5%–15% |
| propylene glycol | 20%–75% |
| non-essential adjuvants | 1%–10% |
| water | remainder. |

These unique emulsions can be obtained by mixing together preformed polymeric latexes, propylene glycol, colorant and non-essential adjuvants in the following stated percentages:

| | |
|---|---|
| polymeric latex | 20%–60% |
| propylene glycol | 20%–75% |
| colorant | 0%–60% |
| non-essential adjuvants | 0%–10%. |

One preferred type mixture of the invention is a color-free base having a milky appearance which consists essentially of the following ingredients in the stated percentages:

| | |
|---|---|
| acrylic latex | 20%–60% |
| propylene glycol | 20%–75% |
| non-essential adjuvants | 0%–10%. |

Another preferred type mixture of the invention is a color mixture which consists essentially of the following ingredients in the stated percentages:

| | |
|---|---|
| acrylic latex | 20%–60% |
| propylene glycol | 20%–60% |
| colorant | 1%–60% |
| non-essential adjuvants | 0%–10%. |

An advantageous color type mixture of the invention consists essentially of the following ingredients in the stated percentages:

| | |
|---|---|
| acrylic latex | 40% |
| propylene glycol | 40% |
| colorant | 20%. |

The above percentages and all other percentages referred to herein are percentages by weight of the stated component based on the total weight of the composition containing such component.

The propylene glycol component is a commercially available chemical.

The polymeric latexes used in accordance with the invention as selected from the group consisting of acrylic latexes and polyurethane latexes.

The acrylic latex components are commercially available as aqueous emulsions of acrylic polymers and copolymers, e.g., emulsions of polymers of methyl acrylate, emulsions of methyl acrylate/vinyl acetate copolymers, etc., which when compounded with pigments, dyes or other colorant, are widely available as paints. Acrylic latexes preferred for use in the invention contain between 10% and 75%, particularly 15%–50%, polymer solids with the remainder being water containing small amounts of wetting agents, emulsifiers and like adjuvants. Examples of commercially available acrylic latexes for use in the invention include: Flexbond 325™ and Flexbond 380™ (Air Products and Chemicals, Inc.), UCD 156W™ (Morton International Inc.) and Aquamac 436™ (McWorter Inc.).

Examples of commercially available polyurethane latexes for use in the invention include: Flexthane FT620™ (Air Products and Chemicals, Inc.) and Sancure® 1514 (Sanncor Industries, Inc.).

Colorants useable in the invention are widely available as commercial dyes and pigments. They may be provided to uncolored latex/glycol mixtures of the invention as separate items or as a premixed component of the acrylic latex, such as where the acrylic latex used to form the color mixtures supra is a commercially available acrylic paint.

The colorant should be a type that can be dissolved or dispersed in water, i.e., oil base dyes and pigments are not suitable. Since organic dyes do not remain colorfast for long periods of time, particularly when exposed to sunlight, water dispersible pigments are best used as colorants for the methods of the invention. A variety of such type pigments are commercially available typically containing ethylene glycol, diethylene glycol, microtaic and/or tributyl phosphate. White colorants, for example, may be titanium dioxide finely ground into diethylene glycol so they will mix with water.

Adjuvants for use in the new emulsions include wetting agents, emulsifiers, plasticizers, glycerine, ethylene glycol, starch and other materials frequently used as additives to aqueous emulsions that will not adversly react with the acrylic or polyurethane polymer component or propylene glycol.

The objects are further accomplished, in part, in accordance with the invention by the provision of blending solvent mixtures for the production of faux finishes which consist essentially of the following ingredients in the stated percentages:

| | |
|---|---|
| isopropyl alcohol | 10%–30% |
| ethylene glycol monobutyl ether | 10%–30% |
| water | 30%–60% |
| acrylic latex | 5%–30%. |

The acrylic latex in these unique blending solvent mixtures primarily gives body to the new mixtures and prevents running, particularly on vertical surfaces. Such latex is like that used in the color mixtures of the invention and may be uncolored or colored with dye and/or pigment.

The color mixtures and blending solvent mixtures of the invention may contain minor amounts, e.g., 0.1–10% of non-essential adjuvants, e.g., detergents, wetting agents, thickeners, etc. Specific adjuvants useable in the new compositions include glycerine, C1–C6 alkanols, alkylene glycol monoalkyl ethers, polyethylene glycols, starch, methyl cellulose, etc.

The new compositions are used in accordance with the invention in new methods for the production of faux finishes. Such methods comprise the steps of:

(a) providing a color mixture having a composition in accordance with the invention, (b) forming a layer of the color mixture on the surface of a substrate, e.g., by brushing, spraying, etc. a quantity of the color mixture onto such surface, (c) providing a blending solvent mixture having a composition as stated above, (d) applying random portions of the blending solvent mixture over the layer of color mixture, e.g., by dabbing, spraying, etc., quantities of the blending solvent mixture at random locations onto the layer of color mixture, (e) allowing such random portions of the blending solvent mixture to act upon the layer of color mixture to form a faux finish pattern on the substrate surface and (f) allowing the resulting faux finish pattern to dry.

In some embodiments of the invention, steps (a) and (b) will be repeated at least one additional time so that at least two different color mixtures are provided and used to form additional layers on portions of the substrate.

Also, in some embodiments of the invention, steps (c) and (d) will be repeated at least one additional time so that at least two different blending solvent mixtures are provided and applied over random portions of the layer or layers of color mixture.

The color mixtures of the invention are not fast drying. Thus, they will take at least several hours to become dry to the touch. This permits the faux finish pattern formed by interaction of the blending solvent mixture with the color mixture to be modified if such pattern is not precisely what is desired. Such modification can be done is several ways. For example, additional random portions of the same or different blending solvent mixture may be applied. Also, portions of such pattern may be moved or removed by brush, swab or the like. Further, additional random portions of color mixture may be applied on top of selected portions of the blending solvent mixture while they are still wet.

Depending upon the marbled effect sought to be created, a single color mixture may be used with a white, black or colored substrate surface. Often, however, as previously stated, two or more color mixtures are used. In any event, a layer of such mixtures is placed on the substrate surface in any desired arrangement by spray, sponge, brush, pad, paper towel, etc. Thus, a person operating in accordance with the invention can control the final faux design by this placement of the color mixtures on the substrate surface, but the step in the new methods of applying the blending solvent mixture serves to convert the layer of color mixture into a spectacular faux finish.

The new methods of the invention allow lay persons to produce a wide variety of decorative faux finishes with ease and yet allow for much creativity in the choice of color and how they are padded or otherwise easily applied to the substrate absorbent surface. Unlike old faux finish methods, a relative novice can produce high quality, decorative finishes since the unique colorant movement critical to the final effect is built into the color mixtures and the blending solvent mixtures of the invention, eliminating the mandatory artistic skills of prior art faux production methods.

DESCRIPTION OF THE PREFERRED EMBODIMENTS

The production of a faux finish on a substrate in accordance with the invention begins with a substrate having a color absorbent surface. Typically, the substrate will be a top or other surface of a piece of furniture, a wall panel or any other surface which someone desires to make appear to be made from marble, granite or some other aesthetic appearing material of construction.

The surface of a substrate can be rendered color absorbent in a variety of ways. For example, if the substrate is wood, e.g., the top of a table, existing surface coatings thereon, e.g., varnish, would preferably be removed and the surface dressed with fine abrasive paper. This would then be painted with a flat, acrylic base latex paint which, when dry, presents an ideal absorbent surface to be further treated in accordance with the invention. Oil-base flat paints and lacquer primer surfacers that produce a color absorbent surface may be used in place of latex paint.

If the substrate is metal, a suitable primer is advantageously applied before painting with the flat paint. Alternatively, with metal as well as other surfaces, e.g., plastic, wood, slate, glass, etc., a layer of absorbent paper or cloth may cemented to the substrate. In any use of paint, paper or cloth to form the absorbent surface, it may be variegated or all white, black or colored.

With the substrate surface ready, the next step is to provide at least one color mixture comprising ingredients in the percentages as stated previously.

Depending upon the faux effect sought to be created, a single color mixture may be used with a white, black or colored substrate surface. More often, however, two or more aqueous color mixtures are used. In any event, one or more layers of such color mixtures are placed on the absorbent substrate surface in by spray, sponge, brush, pad, paper towel, etc. Thus, a person operating in accordance with the invention can control the final faux design by this placement of the color mixtures on the substrate surface, but the next step in the new methods serves to convert a drab placement of color mixture(s) into a spectacular faux finish.

The unique step in forming faux finishes of the invention occurs in applying to the placed layers of color mixture(s), while still wet, scattered portions of a blending solvent mixture(s) as specified previously and allowing such scattered portions to act upon the wet, color mixture layer to form same into a faux finish pattern. When this is done, the surface of the substrate becomes alive with motion. This is due to the blending solvent mixture interacting with the color mixture(s) layer(s) forming puddle lines, veins or other color barriers which move into spectacular designs. The discovery of this unique effect serves to create spectacular faux effects without the labor intensive requirements of prior faux finishing methods capable of producing high quality finishes.

The unique color motion action attained by the invention can be controlled to some extent by change in proportions in the color mixtures and in the blending solvent mixtures. Since the resulting faux finished surface takes several hours to dry, it may be modified by local application of limited amounts of the same or different blending solvent mixture or by manual reworking, i.e., retouching.

After, application of the blending solvent solution portions, the resulting faux finish pattern is allowed to dry. Advantageously, a transparent protective coating may be applied to the resulting dry faux finish pattern.

In a specific performance of the new method of the invention, as a first step, an clear base mixture (CBM) having the following composition is first provided:

| | |
|---|---|
| acrylic latex (25% acrylic polymer) | 50% |
| propylene glycol | 50%. |

From this CBM mixture, mixtures A and B were provided having the following compositions:

| | |
|---|---|
| Color Mixture A: | |
| CBM mixture | 80% |
| white titanium dioxide pigment | 18% |
| carbon black powder | 2%. |
| Color Mixture B: | |
| CBM mixture | 80% |
| white titanium dioxide pigment | 15% |
| prussian blue pigment | 5%. |

A layer of color mixture A was applied by brush to selected areas of the wall of a building formed of gypsum board previously primed with a coat of flat white latex paint and a layer of color mixture B was also brush applied to the remaining portions of the wall left uncovered by color mixture A. While these layers were still wet, portions of a blending solvent mixture having the following composition:

| | |
|---|---|
| isopropyl alcohol | 20% |
| ethylene glycol monobutyl ether | 20% |
| water | 50% |
| acrylic latex | 10% |

were applied to random areas of the layers and allowed to interact with the color mixture layers thereby automatically forming a faux finish on the wall. Pattern softening of some portions of the wall was accomplished by dry brushing and the wall was then allowed to dry.

The methods of the invention allow a person to produce a wide variety of decorative faux finishes with ease and yet allow for much creativity in the choice of color and how they are padded or otherwise easily applied to the substrate absorbent surface. The creamy mature of the color mixtures of the invention make pattern softening by dry brushing easy to accomplish.

Unlike old faux finish methods, a relative novice can produce high quality, decorative finishes since the unique colorant movement critical to the final effect is built into the colorant mixtures and activation alcohol solutions of the invention, eliminating the mandatory artistic skills of prior faux production methods.

I claim:

1. An aqueous emulsion for use in the production of faux finishes which consists essentially of the following ingredients in the stated percentages by weight:

| | |
|---|---|
| emulsified polymeric resin selected from the group consisting of acrylic resin and polyurethane resin | 5%–15% |
| propylene glycol | 20%–75% |
| colorant | 0%–60% |
| non-essential adjuvants | 0%–10% |
| water | remainder. |

2. An aqueous emulsion for use in the production of faux finishes which consists essentially of the following ingredients in the stated percentages by weight:

| | |
|---|---|
| emulsified polymeric resin selected from the group consisting of acrylic resin and polyurethane resin | 8%–14% |
| propylene glycol | 40%–70% |
| colorant | 1%–50% |
| non-essential adjuvants | 1%–10% |
| water | remainder. |

3. An aqueous emulsion for use in the production of faux finishes which consists essentially of the following ingredients in the stated percentages by weight:

| | |
|---|---|
| emulsified acrylic resin | 5%–15% |
| propylene glycol | 20%–75% |
| non-essential adjuvants | 1%–10% |
| water | remainder. |

4. A mixture for use in the production of faux finishes which consists essentially of the following ingredients in the stated percentages by weight:

| | |
|---|---|
| acrylic latex | 20%–60% |
| propylene glycol | 20%–75% |
| colorant | 0%–60% |
| non-essential adjuvants | 0%–10%. |

5. A mixture of claim 4 which is a clear base mixture which consists essentially of the following ingredients in the stated percentages by weight:

| | |
|---|---|
| acrylic latex | 20%–60% |
| propylene glycol | 20%–75% |
| non-essential adjuvants | 0%–10%. |

6. A mixture of claim 4 which is a color mixture which consists essentially of the following ingredients in the stated percentages by weight:

| | |
|---|---|
| acrylic latex | 20%–60% |
| propylene glycol | 20%–60% |
| colorant | 1%–60% |
| non-essential adjuvants | 0%–10%. |

7. The color mixture of claim 6 which consists essentially of the following ingredients in the stated percentages by weight:

| | |
|---|---|
| acrylic latex | 40% |
| propylene glycol | 40% |
| colorant | 20%. |

8. The color mixture of claim 6 wherein said colorant is selected from dyes or pigments.

9. A blending solvent mixture for the production of faux finishes which consists essentially of the following ingredients in the stated percentages by weight:

| | |
|---|---|
| isopropyl alcohol | 10%–30% |
| ethylene glycol monobutyl ether | 10%–30% |
| water | 30%–60% |
| acrylic latex | 5%–30%. |

10. A blending solvent mixture of claim 9 which consists essentially of the following ingredients in the stated percentages by weight:

| | |
|---|---|
| isopropyl alcohol | 20% |
| ethylene glycol monobutyl ether | 20% |
| water | 50% |
| acrylic latex | 10%. |

* * * * *